Patented Mar. 2, 1954

2,671,087

UNITED STATES PATENT OFFICE 2,671,087

METHOD OF PREPARING 2-MERCAPTO-4-SECONDARY AMINO PYRIMIDINES

George H. Hitchings, Tuckahoe, and Peter Byrom Russell, Crestwood, N. Y., assignors to Burroughs Wellcome & Co. (U. S. A.) Inc., Tuckahoe, N. Y., a corporation of New York No Drawing. Application December 12, 1951, Serial No. 261,394

4 Claims. (Cl. 260—256.5)

This invention relates to novel 4-aminopyrimidine derivatives and a new and improved method of preparing them. It is particularly concerned with the discovery of novel products formed by the reaction of dimercaptopyrimidines with the primary amines which are found to have valuable pharmacological properties and are useful intermediates in synthesizing other 4-aminopyrimidine derivatives. This is a continuation-in-part of our copending applications Serial No. 33,677 and Serial No. 33,678, now abandoned.

The present method is based upon the recognition that primary amines react readily with 2,4-dimercaptopyrimidines to form the corresponding 2-mercapto-4-aminopyrimidine directly and without the difficulties of previous methods which form inseparable mixtures due to the nearly equivalent reactiveness of halogen substituents in the 2-4 positions of the pyrimidine ring.

In accordance with the present invention it is found that primary amines react with 2,4-dimercaptopyrimidines to produce the corresponding 2-mercapto-4-aminopyrimidine to the exclusion of 2-amino substituted components. This reaction may be represented by the equation:

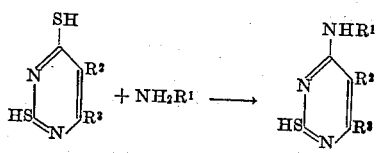

wherein $R^1$ is a radical selected from the class consisting of alkyl, and monocyclic aryl and aralkyl radicals, $R^2$ is a radical selected from the class consisting of alkyl groups and hydrogen, and $R^3$ is a radical selected from the class consisting of alkyl, monocyclic aryl and aralkyl radicals and hydrogen.

When the 2,4-dimercaptopyrimidine compounds contain bulky substituents at the 5 position the reaction does not always follow the same course and in some cases may be inhibited. Reactions of 2,4-dimercaptopyrimidines with ammonia and secondary amines follow a somewhat different course and such reactions are the subject of other applications.

A considerable number of dimercaptopyrimidine derivatives are amenable to this reaction having, for example, the general tautomeric formulae

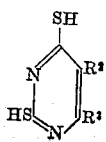

and

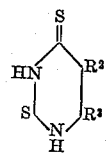

both of which undergo the same reaction with the primary amine and wherein $R^2$ and $R^3$ have the same values as previously indicated. Accordingly, the desired 2-mercapto-4-primary amino substituted pyrimidine may be prepared by the selective action of a primary aliphatic or aromatic amine with a 2,4-dimercaptopyrimidine either unsubstituted or containing a substituent at the 5 position of the pyrimidine ring, whereby the 4-mercapto group is smoothly replaced by the amine to give the corresponding 2-mercapto-4-amino derivative. In these reactions, the 2-mercapto group is not easily replaced by the amino group, thereby avoiding undesirable mixtures in the reaction product. The 2-mercapto group is amenable to replacement by hydrogen, hydroxyl, alkyl-mercapto and other groupings to form other compounds of pharmacological importance.

A particular advantage of the invention resides in the fact that it is possible to obtain a new group of 4-aminopyrimidine compounds having valuable pharmacological properties. These compounds, in accordance with the invention, may be formed by reacting a 2,4-dimercaptopyrimidine compound with a primary amine of the above formula. The new 2-mercapto-4-primary aminopyrimidines formed in accordance with the teachings of the present invention may be converted without difficulty into many useful products of pharmaceutical interest.

The desired 2-mercapto-4-primary aminopyrimidine compound may be readily formed by merely heating the selected reactants under suitable conditions of temperature and pressure depending on the nature of the amine until the reaction is complete. The 2,4-dimercaptopyrimidine derivatives in many cases react readily at a temperature of about 100° to give yields of 80 percent to 90 percent of the corresponding 4-amino derivatives. In most cases the reaction mixture may be heated or refluxed in an open system depending on the boiling point of the amine until the reaction is complete.

A considerable excess of amine is added to the reaction mixture. Suitable proportions for carrying out the reaction may be in general about three mols of the base to about one mol of the 2,4-dimercaptopyrimidine derivative. The mixture becomes homogenous at once with the evolution of heat due to initial salt formation. Application of heat is usually continued for a period of about three hours to complete the reaction.

The desired 2-mercapto-4-primary aminopyrimidine compound may be isolated from the reaction mixture by a number of methods including simple filtration from solution, evaporation of the solution to dryness, followed by crystallization from water or alcohol and simple precipitation of the material from solution with water or in some cases by removal of the excess base from the reaction mixture with ether. The preferred method of isolating the product will depend largely on the physical properties of the particular base used in the reaction.

The nature of the group $R^1$ of the amine does not appear to materially affect the course of reaction. For example, tetradecylamine reacted readily with the 2,4-dimercaptopypyrimidine. The reaction also proceeded smoothly to completion in the case of hydroxyamines such as ethanolamine. Moreover, the presence of a tertiary amino group as in beta-diethylaminoethylamine did not preclude the reaction although the yield of the final product was somewhat lower.

The presence or absence of a substituent other than hydrogen at the 6 position of the pyrimidine ring also did not seem to materially affect the course of reaction as will be apparent from the specific examples to follow.

The aromatic primary amines react readily with 2,4-dimercaptopyrimidine derivatives with the evolution of hydrogen sulphide when combined at reflux temperature. For example, in the case of aniline and its derivatives, there was no indication of reaction at 100° but when one mol of 5-methyldithiouracil was heated with three mols of aniline at the reflux temperature, the reaction proceeded smoothly to give a 90 percent yield of pure 2-mercapto-5-methyl-4-anilinopyrimidine while other anilines reacted with equal facility.

The following examples illustrate specific instances of the various applications in accordance with the present invention.

Example 1

1.3 g. of 5-methyldithiouracil was heated with 10 ccs. of a 33 percent aqueous methylamine solution in a bomb at 100° for three and one-half hours. The contents of the tube was evaporated to dryness, dissolved and crystallized a number of times from hot aqueous solution to recover a 60 percent yield of 2-mercapto-5-methyl-4-methylaminopyrimidine.

Example 2

The procedure of Example 1 was repeated with 5-n-amyldithiouracil to form 2-mercapto-5-n-amyl-4-methylaminopyrimidine in 75 percent yield, M. P. 198°.

Example 3

The procedure of Example 1 was repeated with 5-n-amyl-6-methyldithiouracil to give a 65 percent yield of 2-mercapto-5-n-amyl-6-methyl-4-methylaminopyrimidine.

Example 4

The procedure of Example 1 was repeated with 5-methyl-6-n-amyldithiouracil to form a 75 percent yield of 2-mercapto-5-methyl-6-n-amyl-4-methylaminopyrimidine.

Example 5

The procedure of Example 1 was again repeated using 5-ethyl-6-n-propyldithiouracil to form a 50 percent yield of 2-mercapto-5-ethyl-6-n-propyl-4-methylaminopyrimidine.

Example 6

The procedure of Example 1 was repeated using 5-ethyl-6-phenyldithiouracil to form a 70 percent yield of 2-mercapto-5-ethyl-6-phenyl-4-methylaminopyrimidine.

Example 7

0.75 g. of 5-methyldithiouracil and 3.5 g. of tetradecylamine were combined and heated at about 100° over a water bath with the evolution of hydrogen sulphide for a period of about three hours. The excess base was dissolved and extracted with ether and the residue recrystallized several times from ethanol to form needles of 2-mercapto-5-methyl-4-tetradecylaminopyrimidine.

Example 8

The procedure of Example 7 was repeated using 5-hexyldithiouracil to produce an 80 percent yield of 2-mercapto-5-hexyl-4-tetradecylaminopyrimidine.

Example 9

The procedure of Example 7 was repeated using 5,6-dimethyldithiouracil to produce a 50 percent yield of 2-mercapto-5-tetradecyl-6-methyl-4-tetradecylaminopyrimidine.

Example 10

The procedure of Example 7 was carried out with 5-methyl-6-n-propyldithiouracil and n-amylamine to form a 60 percent yield of 2-mercapto-5-methyl-6-n-propyl-4-n-amylaminopyrimidine.

Example 11

0.75 g. of 5-methyldithiouracil and 3.3 g. of benzylamine were mixed together and heated at 100° over a water bath for a period of about three hours. A yield of 60 percent 2-mercapto-5-methyl-4-benzylaminopyrimidine was recovered by extraction and crystallization.

Example 12

The procedure of Example 11 was carried through with 5-ethyl-6-phenyldithiouracil to form a 60 percent yield of 2-mercapto-5-ethyl-6-phenyl-4-benzylaminopyrimidine.

Example 13

0.95 g. of 5-propyldithiouracil was heated with 4.5 g. of beta-hydroxyethylamine over a water bath with the evolution of hydrogen sulphide for a period of three hours. The excess base was extracted as before and the 2-mercapto-5-propyl-4-beta-hydroxyethylaminopyrimidine recovered in about 80 percent yield.

Example 14

The process of the preceding example was repeated with 5-methyl-6-phenyldithiouracil to form an 85 percent yield of 2-mercapto-5-methyl-6-phenyl-4-beta-hydroxyethylaminopyrimidine.

Example 15

0.65 g. of 5-propyl-6-methyldithiouracil was refluxed with 2 ccs. of aniline for three hours, the excess aniline extracted with ether and the product washed with ammonia to dissolve any unchanged dithio compound. The product recrystallized from water was 2-mercapto-5-propyl-6-methyl-4-anilinopyrimidine in 80 percent yield.

Example 16

The procedure of Example 15 was repeated using 5-methyl-6-phenyldithiouracil to give a 75 percent yield of 2-mercapto-5-methyl-6-phenyl-4-anilinopyrimidine.

Example 17

1.3 g. of dithiouracil was dissolved in 10 ccs. of a 33 percent aqueous methylamine solution and the mixture heated in a bomb at 100° for a period of about three and one-half hours. When the tube was opened, the contents including the reaction product was evaporated to dryness and recrystallized from a hot aqueous solution. The 2-mercapto-4-methylaminopyrimidine was recovered as colorless prisms in about 60 percent yield having a melting point of 236°–237°.

Example 18

0.65 g. of dithiouracil and 3.3 g. of tetradecylamine were mixed together and heated at 100° in a water bath with the evolution of hydrogen sulphide. The reaction was allowed to continue at this temperature for a period of three hours for completion of the reaction. The excess base in the reaction mixture was extracted with ether and the residue dissolved and recrystallized several times from ethyl alcohol to give a yield of about 80 percent. The 2-mercapto-4-tetradecylaminopyrimidine appeared as colorless needles having a melting point of 148°–149°.

Example 19

The process according to Example 18 was repeated using n-amylamine as a reagent. The product obtained on crystallization was 2-mercapto-4-n-amylaminopyrimidine, melting point of 218°.

Example 20

The process according to Example 18 was repeated using benzylamine as the base. The product obtained on crystallization was 2-mercapto-4-benzylaminopyrimidine, melting point of 248°–249°.

Example 21

The process according to Example 18 was repeated using beta-methylhexylamine to produce 2 - mercapto - 4 - beta - methylhexylaminopyrimidine.

Example 22

The process of Example 17 was repeated using n-propylamine with 2,4 - dimercapto - 6 - ethyl-pyrimidine to give 2-mercapto-6-ethyl-4-propylaminopyrimidine.

Example 23

The procedure set forth in Example 17 was repeated using n-hexylamine and 2,4-dimercapto-6-phenylpyrimidine to give 2-mercapto-6-phenyl-4-n-hexylaminopyrimidine.

Example 24

0.65 g. of dithiouracil and 1.76 g. of beta-diethylaminoethylamine were brought together and heated at a temperature of about 100° until the reaction was complete. The excess base was washed away with ether, the residue treated with water and the product crystallized from solution. On recrystallization from ethyl alcohol, a 50 percent yield of 2-mercapto-4-beta-diethylaminoethylaminopyrimidine was obtained in the form of plates having a melting point of 114°–115°.

Example 25

The process of Example 18 was again repeated using beta-hydroxyethylamine as the base to form 2 - mercapto - 4-beta-hydroxyethylaminopyrimidine, melting point of 226°–228°.

Example 26

0.65 g. of 6-methyldithiouracil and 2 ccs. of aniline were refluxed for three hours. The excess aniline was removed with ether and the product washed with ammonia to dissolve any unchanged dithio compound. The product recrystallized from water was 2-mercapto-6-methyl-4-anilinopyrimidine, M. P. 230° C.; the yield was 80%.

Example 27

The process of Example 26 was followed using 6-n-amyldithiouracil and aniline as reagents to give 2-mercapto-6-n-amyl- 4 -anilinopyrimidine, M. P., 227°–228°.

Example 28

The process of Example 26 was followed with 6-phenyldithiouracil to give 2-mercapto-6-phenyl-4-anilinopyrimidine.

Example 29

The process of Example 26 was followed using 6-phenyldithiouracil and tetradecylamine to give 2 - mercapto - 6 - phenyl - 4 - tetradecylaminopyrimidine.

Example 30

Dithiouracil was refluxed with a molar excess of aniline to form 2-mercapto-4-anilinopyrimidine. The yield was approximately 90 percent and melting point 285°.

Example 31

Dithiouracil was combined with an excess of p-Cl-aniline in an open system at a temperature of 180°. The yield was about 90 percent of 2-mercapto-4-p-chloroanilinopyrimidine having a melting point of 299°.

Example 32

6-methyldithiouracil was combined with n-amylamine at 100° to give a 75 percent yield of 2-mercapto - 6 - methyl - 4 - n - amylaminopyrimidine having a melting point of 221°.

Example 33

6-phenyldithiouracil was combined with n-amylamine at a temperature of 100° in an open system to give a 70 percent yield of 2-mercapto-6-phenyl-4-n-amylaminopyrimidine having a melting point of 227°–228°.

Example 34

6-phenyldithiouracil was reacted with p-methoxyaniline at a temperature of 180° to give an 82 percent yield of 2-mercapto-6-phenyl-4-p-methoxyanilinopyrimidine of melting point 264°–265°.

The examples outlined above are merely illustrative of methods conveniently employed in preparing the compounds of the present invention and it will be appreciated that other equally feasible methods may be utilized.

Other examples of compounds falling within the scope of the present invention which may be prepared by similar procedures are the following:

(35) 2 - mercapto - 5 - methyl - 4 - n - amylaminopyrimidine
(36) 2 - mercapto - 5 - methyl - 4 - anilinopyrimidine
(37) 2 - mercapto - 5 - methyl - 4 - methylaminopyrimidine
(38) 2 - mercapto - 5 - methyl - 4 - ethylaminopyrimidine
(39) 2 - mercapto - 5 - methyl - 4 - beta - hydroxyethylaminopyrimidine
(40) 2 - mercapto - 5 - methyl - 4 - beta - dimethylaminoethylaminopyrimidine

(41) 2 - mercapto - 5 - methyl - 4 - beta - diethylaminoethylaminopyrimidine
(42) 2 - mercapto - 5 - methyl - 4 - beta - (4' - morpholino)ethylaminopyrimidine
(43) 2 - mercapto - 5 - methyl - 4 - p - chloroanilinopyrimidine
(44) 2 - mercapto - 5 - methyl - 4 - p - methoxyanilinopyrimidine
(45) 2 - mercapto - 5 - methyl - 4 - p - methylanilinopyrimidine
(46) 2 - mercapto - 5,6 - dimethyl - 4 - methylaminopyrimidine
(47) 2 - mercapto - 5,6 - dimethyl - 4 - n - butylaminopyrimidine
(48) 2 - mercapto - 5,6 - dimethyl - 4 - anilinopyrimidine
(49) 2 - mercapto - 5,6 - dimethyl - 4 - beta - diethylaminoethylaminopyrimidine
(50) 2 - mercapto - 5,6 - dimethyl - 4 - p - methoxyanilinopyrimidine
(51) 2 - mercapto - 5,6 - dimethyl - 4 - benzylaminopyrimidine
(52) 2 - mercapto - 5,6 - dimethyl - 4 - anisylaminopyrimidine
(53) 2 - mercapto - 5,6 - dimethyl - 4 - p - chloroanilinopyrimidine
(54) 2 - mercapto - 5 - ethyl - 6 - methyl - 4 - ethylaminopyrimidine
(55) 2 - mercapto - 5 - ethyl - 6 - methyl - 4 - benzylaminopyrimidine
(56) 2 - mercapto - 5 - ethyl - 6 - methyl - 4 - n - octadecylaminopyrimidine
(57) 2 - mercapto - 5 - n - butyl - 6 - methyl - 4 - n - eicosylaminopyrimidine
(58) 2 - mercapto - 5 - ethyl - 6 - phenyl - 4 - n - octadecylaminopyrimidine
(59) 2 - mercapto - 5 - methyl - 6 - phenyl - 4 - beta - dimethylaminopyrimidine
(60) 2 - mercapto - 5 - n - butyl - 6 - phenyl - 4 - isopropylaminopyrimidine
(61) 2 - mercapto - 5 - methyl - 4 - homoveratrylaminopyrimidine
(62) 2 - mercapto - 5 - methyl - 4 - anisylaminopyrimidine
(63) 2 - mercapto - 5 - decyl - 4 - benzylaminopyrimidine
(64) 2 - mercapto - 5 - methyl - 4 - phenethylaminopyrimidine
(65) 2 - mercapto - 5 - methyl - 4 - homoanisylaminopyrimidine
(66) 2 - mercapto - 5 - methyl - 4 - homopiperonylaminopyrimidine
(67) 2 - mercapto - 5 - methyl - 4 - p - bromoanilinopyrimidine
(68) 2 - mercapto - 5 - methyl - 4 - (2,5 - dimethoxyphenethylamino)pyrimidine
(69) 2 - mercapto - 5 - methyl - 4 - (2,3 - dimethoxyphenethylamino)pyrimidine
(70) 2 - mercapto - 5 - methyl - 4 - (2,4 - dimethoxyphenethylamino)pyrimidine
(71) 2 - mercapto - 5,6 - dimethyl - 4 - homoanisylaminopyrimidine
(72) 2 - mercapto - 5 - n - butyl - 6 - methyl - 4 - anisylaminopyrimidine
(73) 2 - mercapto - 5 - ethyl - 6 - p - chlorophenyl - 4 - n - hexadecylaminopyrimidine
(74) 2 - mercapto - 6 - ethyl - 4 - beta - hydroxyethylaminopyrimidine
(75) 2 - mercapto - 6 - p - methoxyphenyl - 4 - ethylaminopyrimidine
(76) 2 - mercapto - 6 - p - tolyl - 4 - n - propylaminopyrimidine
(77) 2 - mercapto - 6 - methyl - 4 - beta - hydroxyethylaminopyrimidine
(78) 2 - mercapto - 6 - phenyl - 4 - n - eicosylaminopyrimidine
(79) 2 - mercapto - 6 - o - methoxyphenyl - 4 - n - hexadecylaminopyrimidine
(80) 2 - mercapto - 6 - o - bromophenyl - 4 - beta - hydroxyethylaminopyrimidine
(81) 2 - mercapto - 6 - n - propyl - 4 - beta - di - n - butylaminoethylaminopyrimidine
(82) 2 - mercapto - 6 - m - bromophenyl - 4 - (2,4 - dimethoxyphenethyl)aminopyrimidine
(83) 2 - mercapto - 6 - n - propyl - 4 - benzylaminopyrimidine
(84) 2 - mercapto - 4 - n - octadecylaminopyrimidine
(85) 2 - mercapto - 4 - ethylaminopyrimidine
(86) 2 - mercapto - 4 - n - eicosylaminopyrimidine
(87) 2 - mercapto - 4 - iso - amylaminopyrimidine
(88) 2 - mercapto - 4 - tert. butylaminopyrimidine
(89) 2 - mercapto - 4 - sec. butylaminopyrimidine
(90) 2 - mercapto - 4 - (beta - hydroxy iso. propylamino) pyrimidine
(91) 2 - mercapto - 4 - gamma - hydroxypropylaminopyrimidine
(92) 2 - mercapto - 4 - beta - dimethylaminoethylaminopyrimidine
(93) 2 - mercapto - 6 - n - propyl - 4 - homoveratrylamino pyrimidine
(94) 2 - mercapto - 6 - methyl - 4 - octadecylamino pyrimidine

We claim:

1. The method of preparing 2-mercapto-4-secondary aminopyrimidines which consist in reacting a 2,4-dimercaptopyrimidine with a primary amine.

2. The method of preparing compounds of the formula

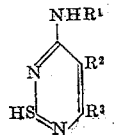

wherein $R^1$ is a radical selected from the class consisting of alkyl and monocyclic aryl and aralkyl radicals, $R^2$ is a radical selected from the class consisting of alkyl groups and hydrogen, and $R^3$ is a radical selected from the class consisting of alkyl, monocyclic aryl and aralkyl radicals and hydrogen, which comprises reacting a primary amine of the formula $NH_2R^1$ with a dithiopyrimidine of the formula

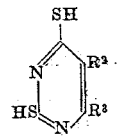

wherein $R^1$, $R^2$ and $R^3$ have the above mentioned values.

3. The method set forth in claim 1 wherein an excess of the amine is employed.

4. The method set forth in claim 1 wherein the reaction takes place at about 100°.

GEORGE H. HITCHINGS.
PETER BYROM RUSSELL.

References Cited in the file of this patent

Schlenker, Ber. Deut. Chem., 34, 2821 (1901).
Gabriel et al., Ber. Deut. Chem., 32, 2930 (1899).